United States Patent
Han et al.

(10) Patent No.: US 9,391,743 B2
(45) Date of Patent: Jul. 12, 2016

(54) METHOD AND APPARATUS FOR DEFINING HARQ FUNCTIONALITY FOR CELLS HAVING DIFFERENT TIME DIVISION DUPLEX SUBFRAME CONFIGURATIONS

(75) Inventors: Jing Han, Beijing (CN); Haiming Wang, Beijing (CN); Wei Bai, Beijing (CN)

(73) Assignee: BROADCOM CORPORATION, Irvine, CA (US)

(*) Notice: Subject to any disclaimer, the term of this patent is extended or adjusted under 35 U.S.C. 154(b) by 0 days.

(21) Appl. No.: 14/111,400

(22) PCT Filed: Apr. 14, 2011

(86) PCT No.: PCT/CN2011/072774
§ 371 (c)(1),
(2), (4) Date: Oct. 11, 2013

(87) PCT Pub. No.: WO2012/139291
PCT Pub. Date: Oct. 18, 2012

(65) Prior Publication Data
US 2014/0029489 A1    Jan. 30, 2014

(51) Int. Cl.
| | |
|---|---|
| *H04B 7/212* | (2006.01) |
| *H04L 1/18* | (2006.01) |
| *H04L 5/00* | (2006.01) |
| *H04L 5/26* | (2006.01) |
| *H04L 5/14* | (2006.01) |

(52) U.S. Cl.
CPC ............ H04L 1/1861 (2013.01); H04L 1/1812 (2013.01); H04L 1/1822 (2013.01); H04L 1/1887 (2013.01); H04L 5/001 (2013.01); H04L 5/14 (2013.01); H04L 5/26 (2013.01)

(58) Field of Classification Search
CPC ... H04L 1/1812; H04L 1/1822; H04L 1/1887; H04L 5/001; H04L 1/1861; H04L 5/26; H04L 5/14; H04W 28/04
USPC ...................... 370/280, 337, 345–347; 455/73
See application file for complete search history.

(56) References Cited

U.S. PATENT DOCUMENTS

| | | | |
|---|---|---|---|
| 2011/0141991 A1 | 6/2011 | Gao | |
| 2013/0250822 A1* | 9/2013 | Yang et al. | 370/280 |

FOREIGN PATENT DOCUMENTS

| | | |
|---|---|---|
| WO | 2010065430 | 6/2010 |
| WO | 2010077103 | 7/2010 |
| WO | 2010144245 | 12/2010 |

* cited by examiner

*Primary Examiner* — Mang Yeung
(74) *Attorney, Agent, or Firm* — Oblon, McClelland, Maier & Neustadt, L.L.P.

(57) ABSTRACT

Methods, apparatus and computer program products are provided for defining the HARQ functionality for primary and secondary cells having different TDD UL/DL subframe configurations so as to reduce or eliminate instances in which the feedback is blocked and the UL grant is missed. For example, a method is provided that includes providing for communications via a primary cell and at least one secondary cell in a time division duplex (TDD) network that supports carrier aggregation in accordance with different TDD uplink (UL)/downlink (DL) subframe configurations. In this example, the method also defines at least one of: (i) UL or DL hybrid automatic repeat request (HARQ) timing, (ii) a maximum number of DL HARQ processes, (iii) a number of UL HARQ processes or (iv) an UL HARQ process mapping to be the same for each of the primary and secondary cells having different TDD UL/DL subframe configurations.

13 Claims, 17 Drawing Sheets

METHOD AND APPARATUS FOR DEFINING HARQ FUNCTIONALITY FOR CELLS HAVING DIFFERENT TIME DIVISION DUPLEX SUBFRAME CONFIGURATIONS

TECHNOLOGICAL FIELD

Embodiments of the present invention relate generally to communications technology and, more particularly, to methods and apparatus for defining hybrid automatic repeat request (HARQ) functionality for a primary cell and one or more secondary cells that have different time division duplex (TDD) uplink (UL)/downlink (DL) subframe configurations.

BACKGROUND

Carrier aggregation is a combination of two or more cells or component carriers (CCs) operating at different frequencies in order to provide a broader transmission bandwidth for a mobile terminal. Depending upon its capabilities, a mobile terminal may simultaneously receive or transmit on one or more of the cells. The cells aggregated in accordance with carrier aggregation include a primary cell and one or more secondary cells. The primary cell is the cell that: (i) operates on a primary carrier in which the mobile terminal either performs the initial connection establishment procedure or initiates the connection re-establishment procedure, or (ii) was indicated as the primary cell in a handover procedure. Conversely, a secondary cell is a cell, operating on a secondary carrier, which may be configured once radio resource control (RRC) is established and which may be used to provide additional radio resources.

Although the focus to date has been principally upon frequency division duplex (FDD) networks, time division duplex (TDD) networks that support carrier aggregation must also be considered. Indeed, in a TDD network, the primary cell and the secondary cells may have respective TDD uplink (UL)/downlink (DL) subframe configurations. In Long Term Evolution (LTE) release 10, mobile terminals that support TDD signaling are required to operate in accordance with a TDD UL/DL subframe configuration that is aligned and consistent across the primary and secondary cells that are to be aggregated. Additionally, LTE release 10 required that common discontinuous reception (DRX) parameters be utilized for each of the primary and secondary cells such that the active time and the DRX pattern would be the same for each of the aggregated cells.

For mobile terminals configured in accordance with LTE release 11, however, the primary and secondary cells are permitted to have different TDD UL/DL subframe configurations. These different TDD UL/DL subframe configurations may be useful in order to allow a cell to be compatible with a neighbor legacy TDD system, such as a Time Division Synchronous Code Division Multiple Access (TD-SCDMA) system, for which multiple cells having aligned TDD UL/DL subframe configurations are not available. Additionally, primary and secondary cells having different TDD UL/DL subframe configurations may provide different amounts of resources and a different DL/UL ratio for the mobile terminal. For example, the use of different TDD UL/DL subframe configurations by the primary and secondary cells in LTE release 11 may permit different ones of the cells to provide different coverage by, for example, enabling more UL subframes in a lower frequency cell to enlarge the coverage. The ability to provide different amounts of resources and a different DL/UL ratio may be of particular importance to a mobile terminal that utilizes carrier aggregation since carrier aggregation is oftentimes utilized in an instance in which the mobile terminal has a relatively large amount of data to transmit, thereby increasing the importance of defining the TDD UL/DL subframe configurations of the primary and secondary cells so as to provide a suitable DL/UL ratio and to otherwise efficiently utilize the communication resources.

By allowing the primary and secondary cells to have different TDD UL/DL subframe configurations, however, the different TDD UL/DL subframe configurations of the primary and secondary cells may have overlapped subframes in some instances, such as by one of the cells having a DL subframe at a specific instance in time while another cell has an UL subframe. An example of the TDD UL/DL subframe configuration of a primary cell and a secondary cell is shown in FIG. 1. In this example, subframe 3 is overlapping in that subframe 3 of the primary cell is a UL subframe, while subframe 3 of the secondary cell is a DL subframe.

The mobile terminal may be configured to process one of the overlapping subframes with the other of the overlapping subframes being blocked or otherwise ignored. In order to avoid missing any transmission and reception opportunities, a mobile terminal may be alternatively configured to provide for simultaneous reception and transmission so as to accommodate overlapping subframes.

The TDD UL/DL subframe configuration of a cell normally defines its hybrid automatic repeat request (HARQ) timing and reception. However, in an instance in which the mobile terminal is configured for simultaneous transmission and reception, the HARQ timing and procedure may not directly follow the HARQ timing and procedure otherwise defined for the TDD UL/DL configuration of the respective cells. In this regard, in LTE release 10, the HARQ UL feedback is always supported by the primary cell and the HARQ DL feedback always has the same location as DL assignment. Thus, if the HARQ timing and HARQ process number for each TDD UL/DL subframe configuration of the primary and secondary cells were directly utilized, the overlapping subframes may block some of the desired feedback.

With reference to FIG. 1 in regards to DL HARQ, for example, the primary and secondary cells have TDD UL/DL subframe configurations #1 and #0, respectively. In an instance in which the HARQ timing for TDD UL/DL subframe configurations #1 and #0 were followed, the DL HARQ, that is, the uplink feedback timing, for subframe #0 for the secondary cell would be provided in subframe #4 of the primary cell, since the uplink feedback is always supported by the primary cell. However, subframe #4 of the primary cell is not a UL subframe, but is, instead, a DL subframe. Thus, the UL feedback for subframe #0 of the secondary cell will be blocked and will not be provided by subframe #4 of the primary cell.

In regards to the UL HARQ, which includes the UL grant and the DL feedback timing, a mobile terminal may also experience issues as a result of overlapping subframes in an instance in which cross-scheduling is enabled for the mobile terminal. For example, in an instance in which a secondary cell is cross-scheduled by the primary cell, DL feedback which is carried on the physical HARQ indicator channel (PHICH) on the primary cell will be blocked in an instance in which the subframes providing the DL feedback overlap. As shown in FIG. 2, a secondary cell having TDD UL/DL subframe configuration #1 may provide DL feedback for subframe #3 of the secondary cell on subframe #9. Since the DL feedback has the same location as the DL assignment, the DL feedback will be supported by the primary cell. However, subframe #9 of the primary cell is not a DL subframe in the example of FIG. 2, but is, instead, a UL subframe. As such, the DL feedback will be blocked by the overlapping subframes in this example. A comparable issue with respect to blocking or missing of the UL grant may also be brought about by the overlapping subframes.

BRIEF SUMMARY

Methods, apparatus and computer program products are provided according to an example embodiment for defining the HARQ functionality for primary and secondary cells having different TDD UL/DL subframe configurations so as to reduce or eliminate instances in which the feedback is blocked and/or the UL grant is missed. In one example, the methods, apparatus and computer program product define the HARQ timing and/or HARQ procedure in such a manner as to allow feedback to be provided via the primary and secondary cells even though the primary and secondary cells have different TDD UL/DL subframe configurations with overlapping subframes.

In one embodiment, a method is provided that includes providing for communications via a primary cell and at least one secondary cell in a time division duplex (TDD) network that supports carrier aggregation in accordance with different TDD uplink (UL)/downlink (DL) subframe configurations. The method of this embodiment also defines at least one of: (i) UL or DL hybrid automatic repeat request (HARQ) timing, (ii) a maximum number of DL HARQ processes, (iii) a number of UL HARQ processes or (iv) an UL HARQ process mapping to be the same for each of the primary and secondary cells having different TDD UL/DL subframe configurations.

In another embodiment, an apparatus is provided that includes at least one processor and at least one memory including computer program code with the at least one memory and the computer program code being configured to, with the at least one processor, cause the apparatus at least to provide for communications via a primary cell and at least one secondary cell in a time division duplex (TDD) network that supports carrier aggregation in accordance with different TDD uplink (UL)/downlink (DL) subframe configurations. The at least one memory and the computer program code of this embodiment are also configured to, with the at least one processor, cause the apparatus at least to define at least one of: (i) UL or DL hybrid automatic repeat request (HARQ) timing, (ii) a maximum number of DL HARQ processes, (iii) a number of UL HARQ processes or (iv) an UL HARQ process mapping to be the same for each of the primary and secondary cells having different TDD UL/DL subframe configurations.

In a further embodiment, a computer program product is provided that includes at least one computer-readable storage medium having computer-executable program code instructions stored therein with the computer-executable program code instructions including program code instructions for providing for communications via a primary cell and at least one secondary cell in a time division duplex (TDD) network that supports carrier aggregation in accordance with different TDD uplink (UL)/downlink (DL) subframe configurations. In this embodiment, the computer-executable program code instructions also include program code instructions for defining at least one of: (i) UL or DL hybrid automatic repeat request (HARQ) timing, (ii) a maximum number of DL HARQ processes, (iii) a number of UL HARQ processes or (iv) an UL HARQ process mapping to be the same for each of the primary and secondary cells having different TDD UL/DL subframe configurations.

In yet another embodiment, an apparatus is provided that includes means for providing for communications via a primary cell and at least one secondary cell in a time division duplex (TDD) network that supports carrier aggregation in accordance with different TDD uplink (UL)/downlink (DL) subframe configurations. The apparatus of this embodiment also includes means for defining at least one of: (i) UL or DL hybrid automatic repeat request (HARQ) timing, (ii) a maximum number of DL HARQ processes, (iii) a number of UL HARQ processes or (iv) an UL HARQ process mapping to be the same for each of the primary and secondary cells having different TDD UL/DL subframe configurations.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
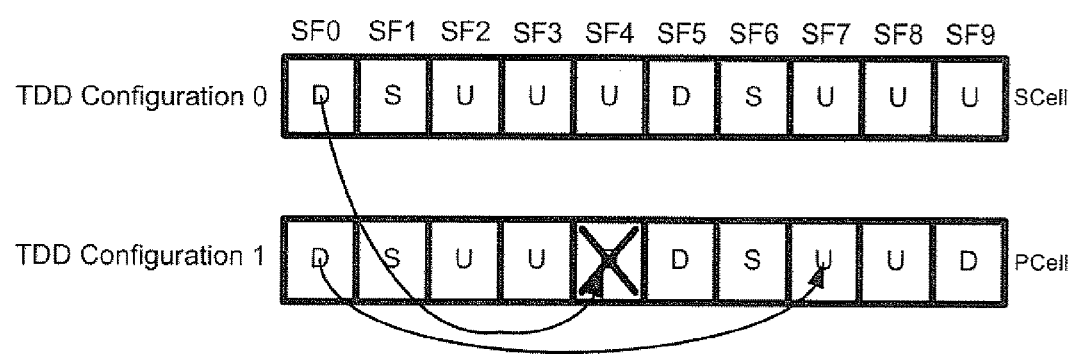
Figure 2:
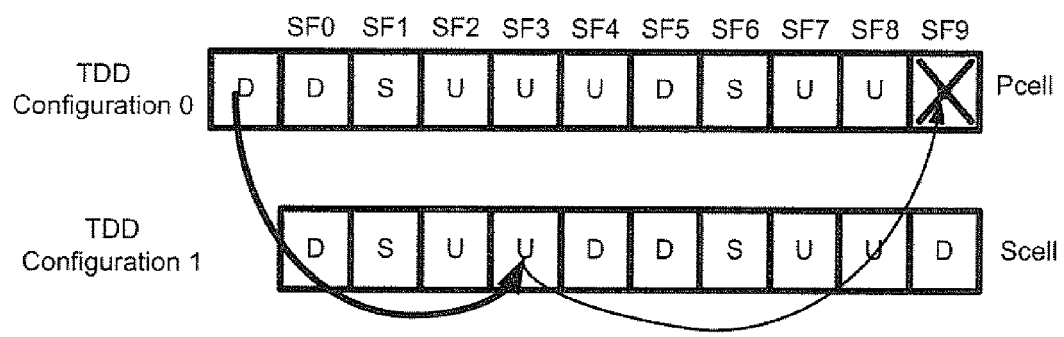
Figure 3:
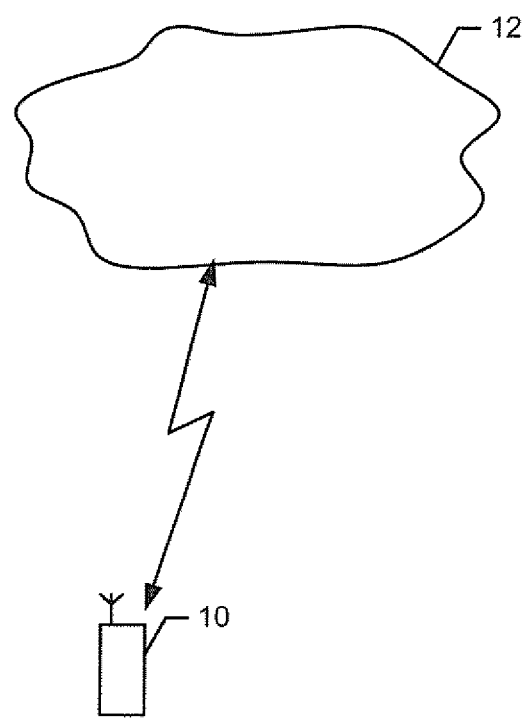
Figure 4:
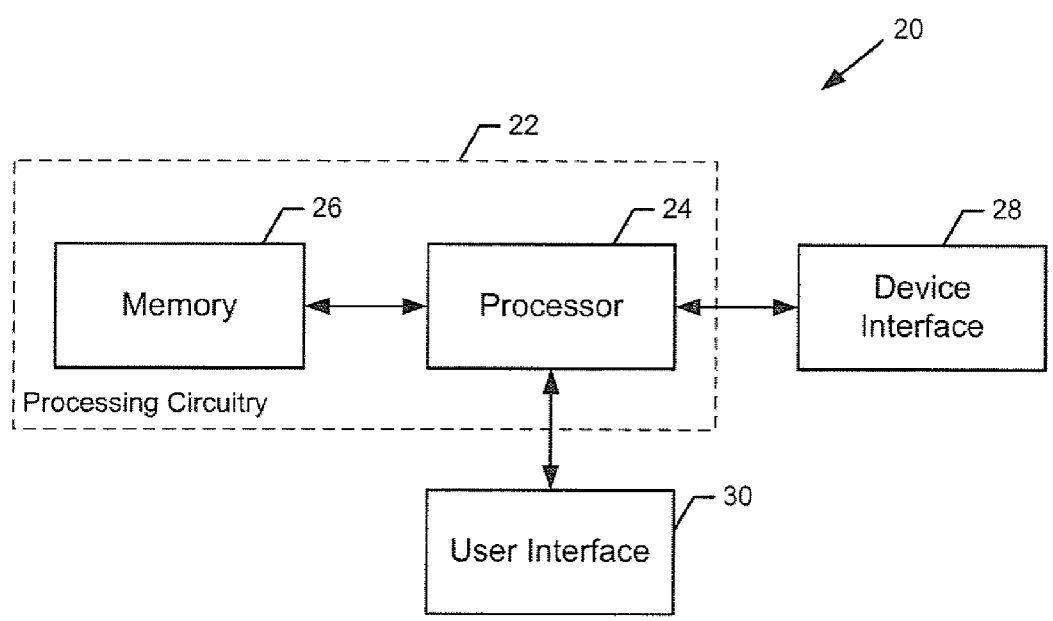
Figure 5:
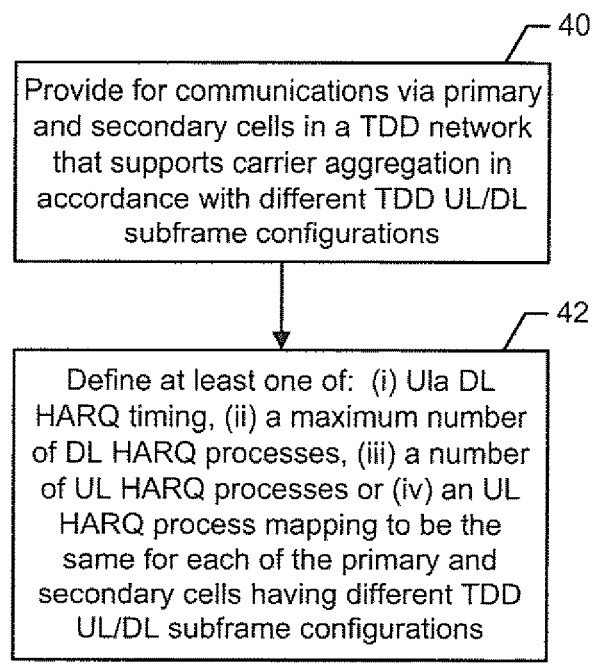
Figure 6:
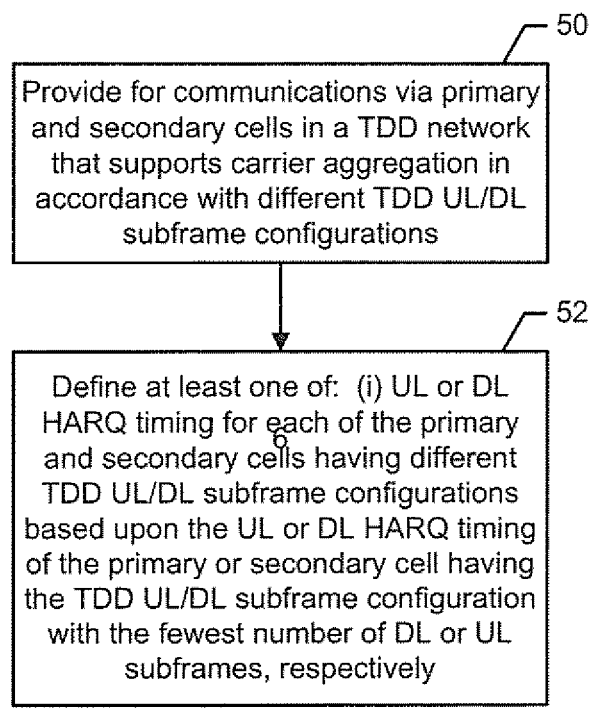
Figure 7:
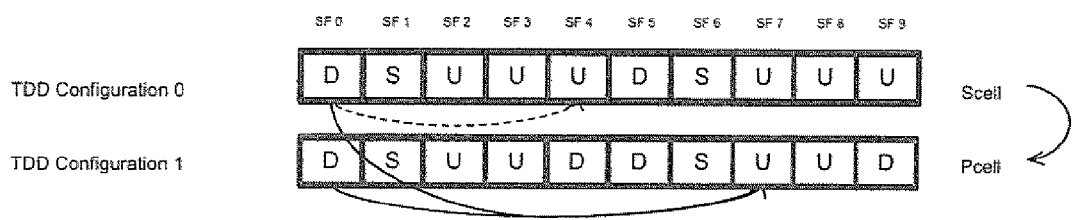
Figure 8:
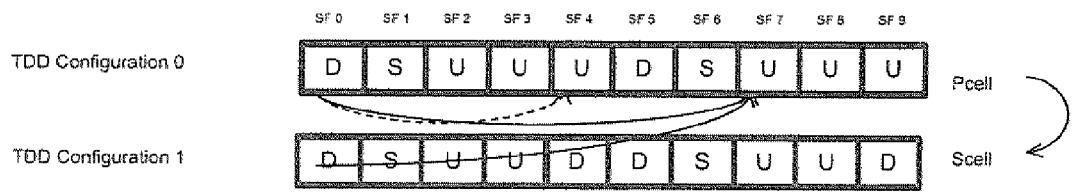
Figure 9:
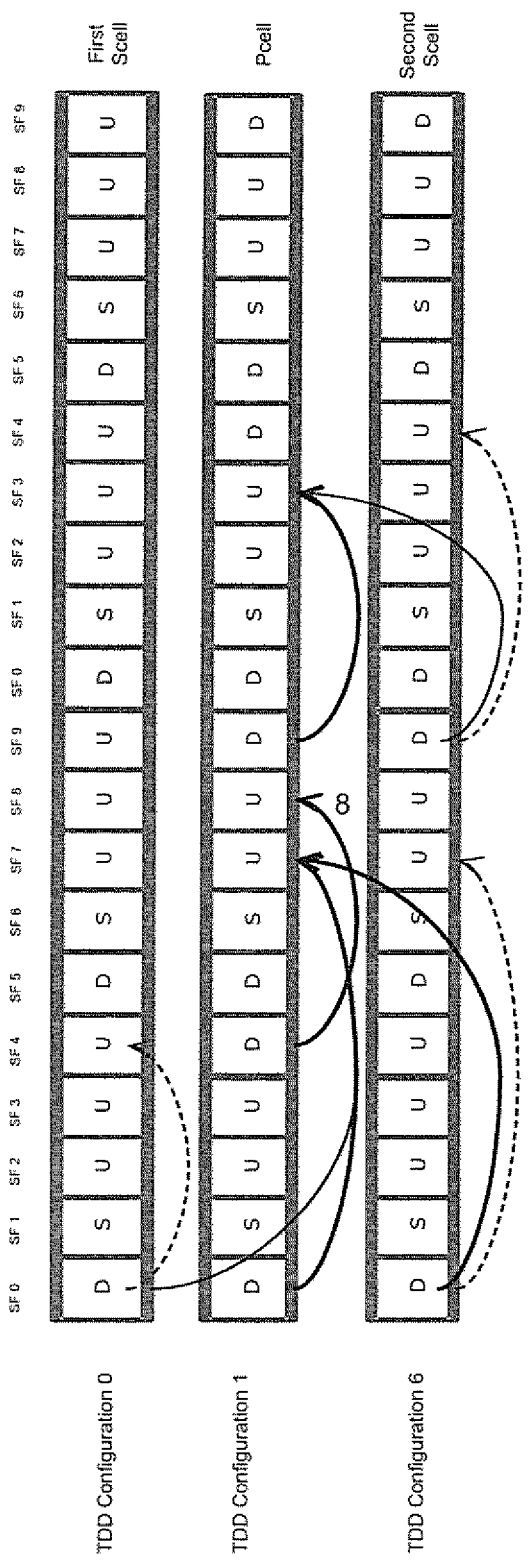
Figure 10:
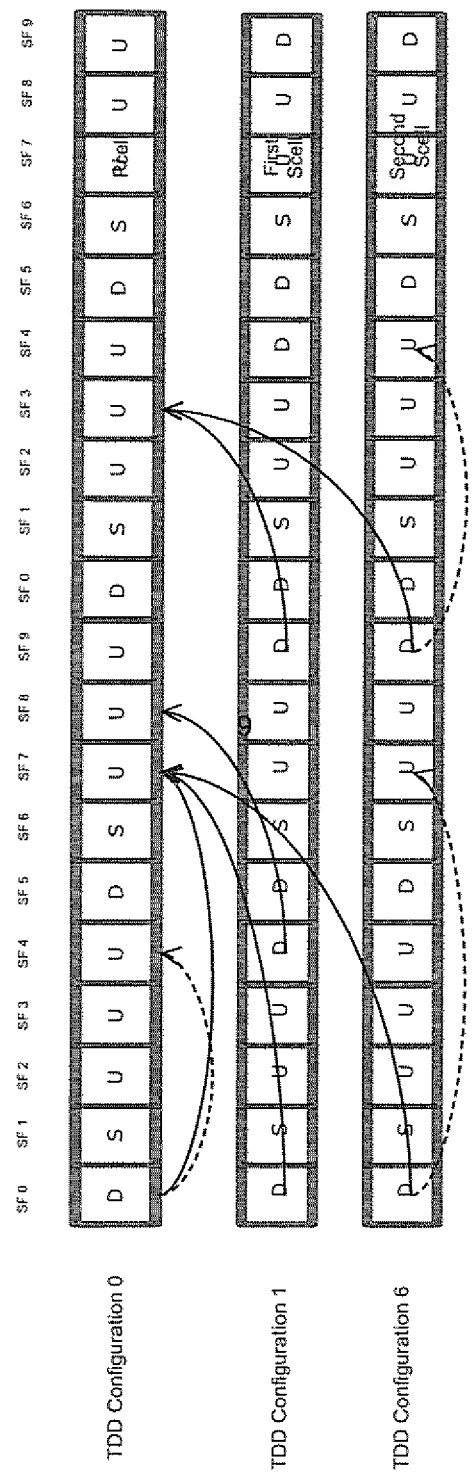
Figure 11:
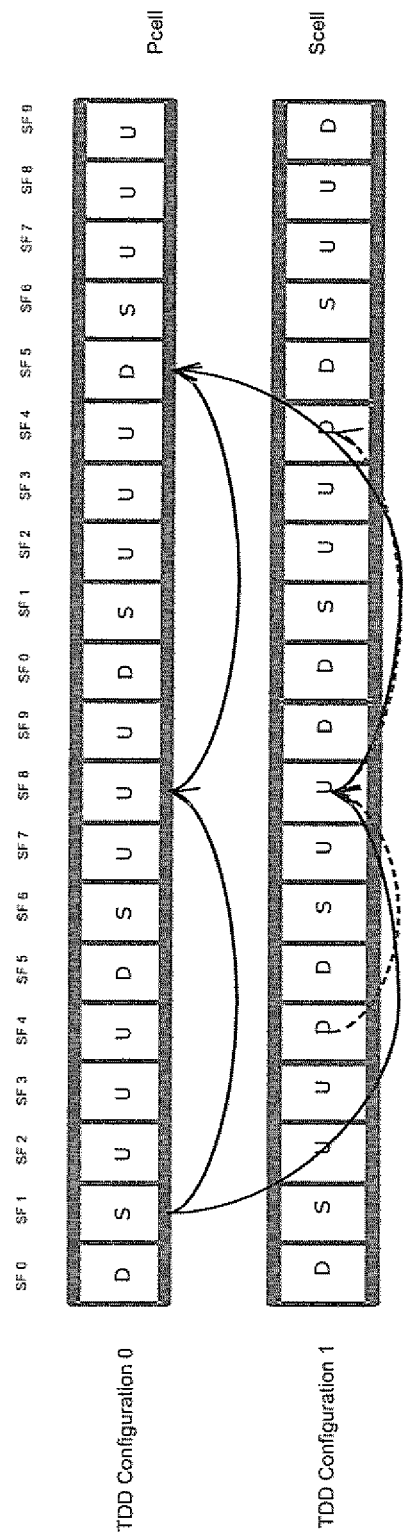
Figure 12:
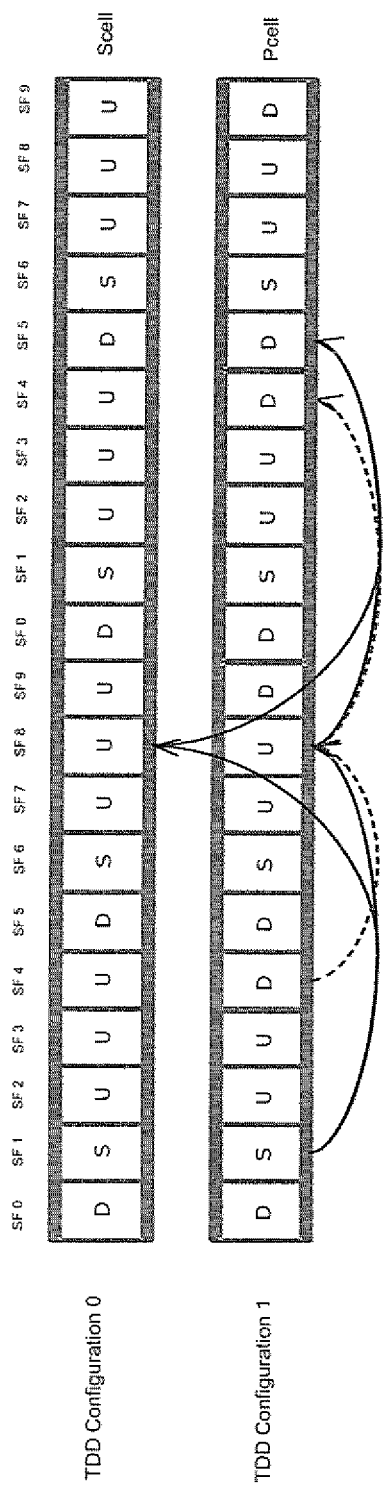
Figure 13:
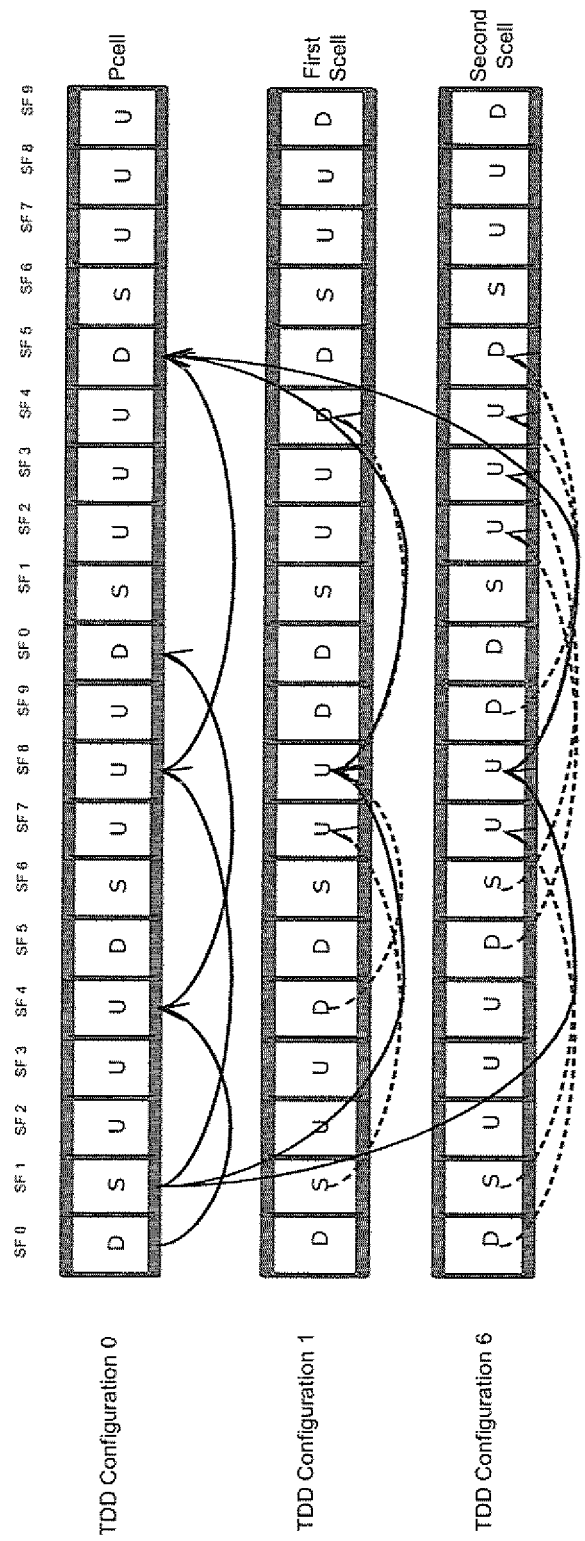
Figure 14:
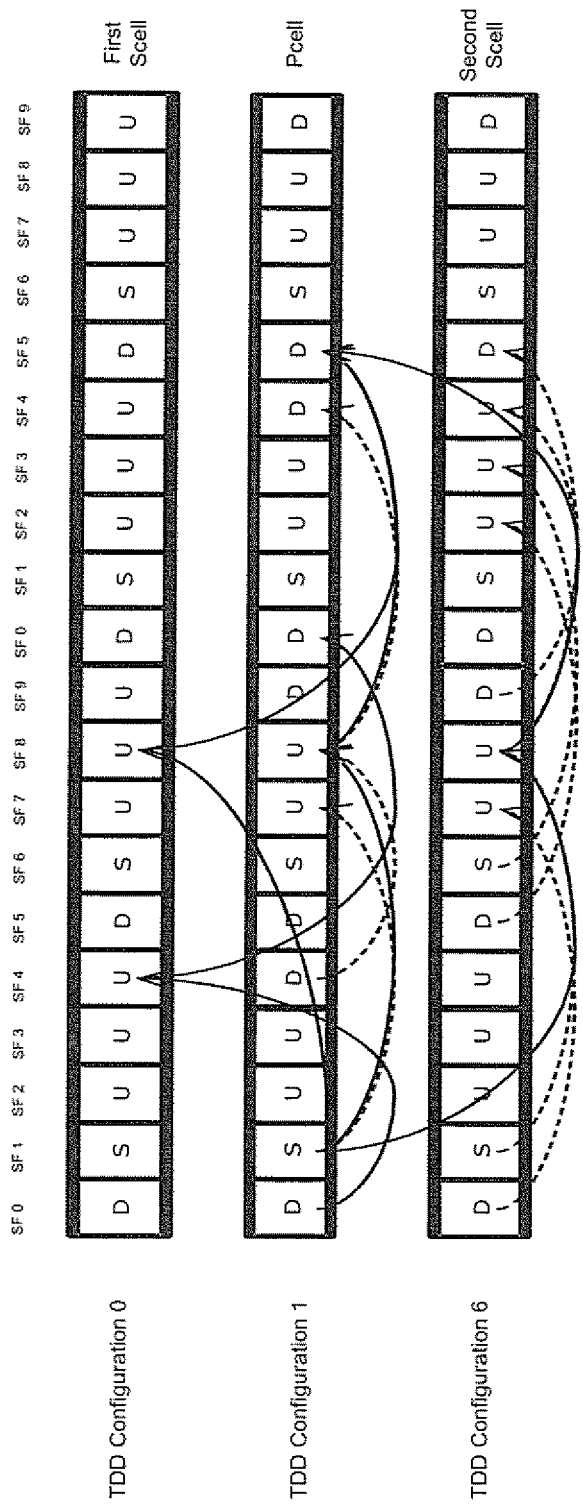
Figure 15:
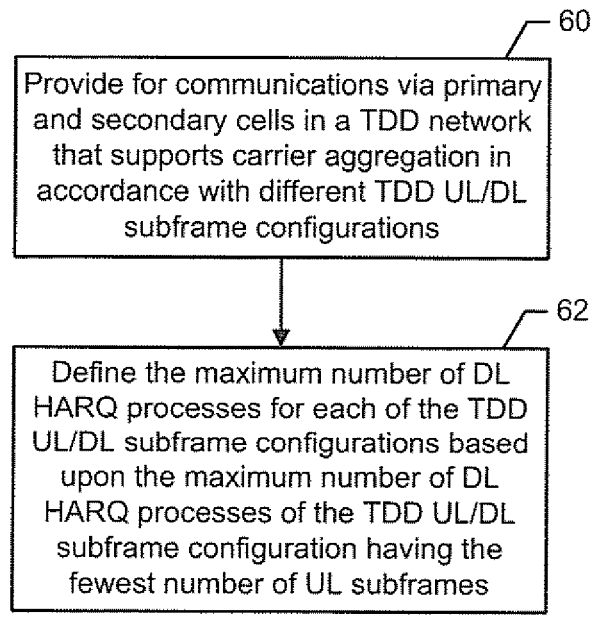
Figure 16:
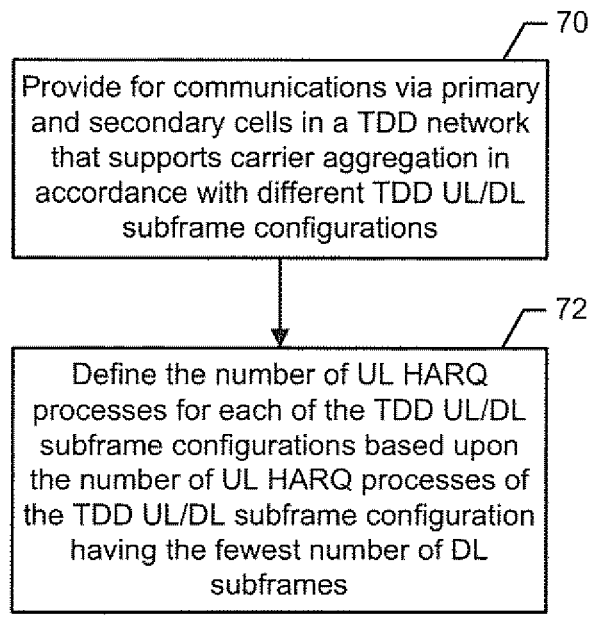
Figure 17:
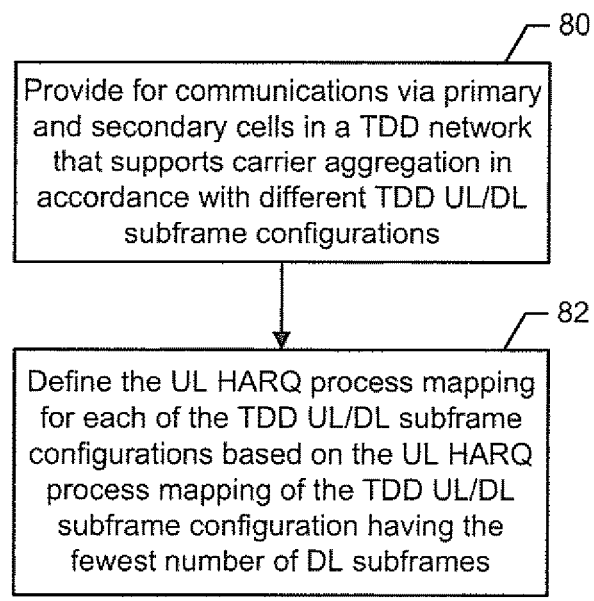
Figure 18:
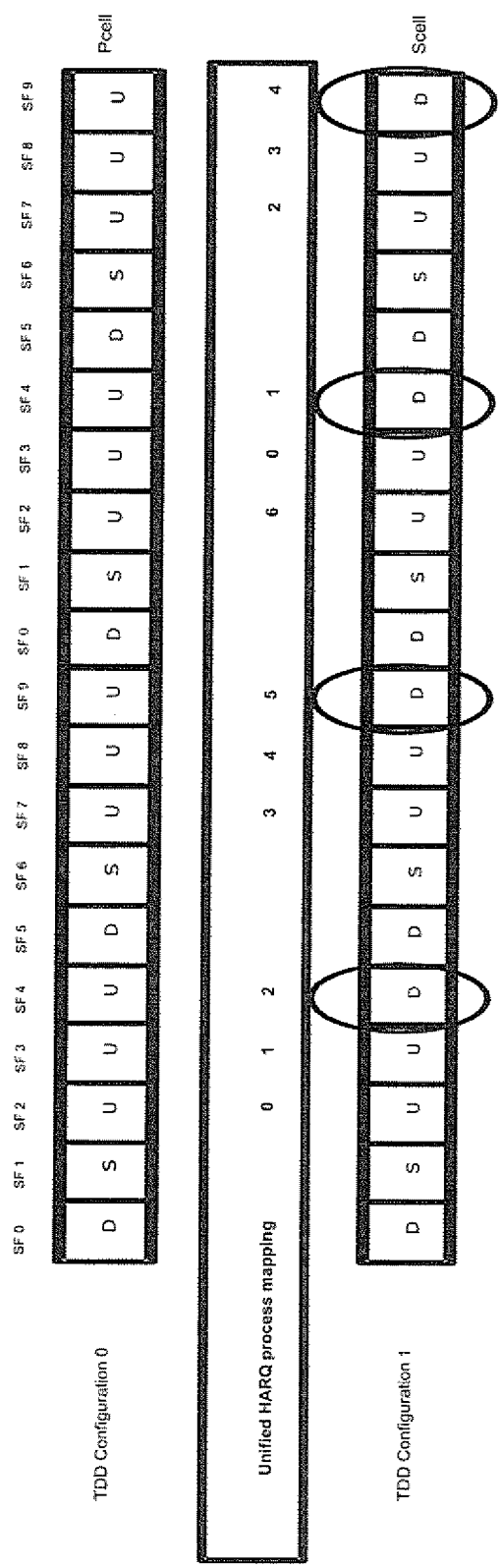

Having thus described example embodiments the invention in general terms, reference will now be made to the accompanying drawings, which are not necessarily drawn to scale, and wherein:

FIG. 1 illustrates the TDD UL/DL subframe configurations of a primary cell and a secondary cell in which UL feedback is blocked due to overlapping subframes;

FIG. 2 illustrates other TDD UL/DL subframe configurations of a primary cell and a secondary cell in which DL feedback is blocked due to overlapping subframes;

FIG. 3 illustrates a system including a mobile terminal configured to support TDD signaling and carrier aggregation in accordance with one embodiment to the present invention;

FIG. 4 is a block diagram of a mobile terminal in accordance with one embodiment of the present invention;

FIG. 5 is a flowchart illustrating operations performed in accordance with one embodiment of the present invention;

FIG. 6 is a flowchart illustrating operations performed to define the HARQ timing in accordance with one embodiment of the present invention;

FIG. 7 illustrates the TDD UL/DL subframe configurations of a primary cell and a secondary cell in an instance in which the primary cell defines the DL HARQ timing in accordance with one embodiment of the present invention;

FIG. 8 illustrates the TDD UL/DL subframe configurations of a primary cell and a secondary cell in an instance in which the secondary cell defines the DL HARQ timing in accordance with one embodiment of the present invention;

FIG. 9 illustrates the TDD UL/DL subframe configurations of a primary cell and two secondary cells in an instance in which the primary cell defines the DL HARQ timing in accordance with another embodiment of the present invention;

FIG. 10 illustrates the TDD UL/DL subframe configurations of a primary cell and two secondary cells in an instance in which one of the secondary cells defines the DL HARQ timing in accordance with another embodiment of the present invention;

FIG. 11 illustrates the TDD UL/DL subframe configurations of a primary cell and a secondary cell in an instance in which the primary cell defines the UL HARQ timing in accordance with one embodiment of the present invention;

FIG. 12 illustrates the TDD UL/DL subframe configurations of a primary cell and a secondary cell in an instance in which the secondary cell defines the UL HARQ timing in accordance with one embodiment of the present invention;

FIG. 13 illustrates the TDD UL DL subframe configurations of a primary cell and two secondary cells in an instance in which the primary cell defines the UL HARQ timing in accordance with another embodiment of the present invention;

FIG. 14 illustrates the TDD UL/DL subframe configurations of a primary cell and two secondary cells in an instance in which one of the secondary cells defines the UL HARQ timing in accordance with another embodiment of the present invention;

FIG. 15 is a flowchart illustrating operations performed to define the maximum number of DL HARQ processes in accordance with another embodiment of the present invention;

FIG. 16 is a flowchart illustrating operations performed to define the UL HARQ process number in accordance with another embodiment of the present invention;

FIG. 17 is a flowchart illustrating operations performed to define the UL HARQ process mapping in accordance with another embodiment of the present invention;

FIG. 18 illustrates the TDD UL/DL subframe configurations of a primary cell and a secondary cell in an instance in which the primary cell defines the UL HARQ process mapping in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

A method, apparatus and computer program product are disclosed for providing for discontinuous reception via a primary cell and one or more secondary cells that have different TDD UL/DL subframe configurations. In this regard, the method, apparatus and computer program product of some example embodiments define the HARQ timing and procedure so as to provide feedback even in the event of overlapping subframes. Although the method, apparatus and computer program product may be implemented in a variety of different systems, one example of such a system is shown in FIG. 2, which includes a first communication device (e.g., mobile terminal 10) that is capable of communication with a network 12 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 12 may include a collection of various different nodes, devices or functions that may be in communication with each other via corresponding wired and/or wireless interfaces. For example, the network may include one or more base stations, such as one or more node Bs, evolved node Bs (eNBs), access points or the like, each of which may serve a coverage area divided into one or more cells. The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network. In accordance with embodiments of the present invention, the network may be a TDD network.

A communication device, such as the mobile terminal 10 (also known as user equipment (UE)), may be in communication with other communication devices or other devices via the network 12. In instances in which the network is a TDD network, the mobile terminal may be configured to support communications in accordance with TDD. In some cases, the communication device may include an antenna for transmitting signals to and for receiving signals from a base station via a plurality of CCs including a primary cell (Pcell) and one or more secondary cells (Scell). As described below, each of the primary and secondary cells may have a TDD UL/DL subframe configuration that defines a predefined sequence of DL subframes, UL subframes and special subframes to be exchanged between the mobile terminal and the network. The TDD subframe configurations of the primary and secondary cells may be different such that there may be one or more overlapping subframes. As such, the mobile terminal of one embodiment may configure the discontinuous reception so as to appropriately respond to the overlapped subframes of the primary and secondary cells.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 12.

In one embodiment, for example, the mobile terminal 10 may be embodied as or otherwise include an apparatus 20 as generically represented by the block diagram of FIG. 4. In the context of a mobile terminal, the apparatus may be configured to provide for discontinuous reception in a manner that appropriately responds to overlapped subframes of the primary and secondary cells. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIGS. 5, 6 and 15-17, flowcharts illustrating the operations performed by a method, apparatus and computer program product, such as apparatus 20 of FIG. 5, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 5, 6 and 15-17, when executed, convert a computer or processing circuitry into a particular machine configured to perforin an example embodiment of the present invention. Accordingly, the operations of each of FIGS. 5, 6 and 15-17 define an algorithm for configuring a computer or processing circuitry, e.g., processor 24, to perform an example embodiment. In some cases, a general purpose computer may be provided with an instance of the processor which performs the algorithm of a respective one of FIGS. 5, 6 and 15-17 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

As shown in block 40 of FIG. 5, an apparatus 20 according to one embodiment of the present invention includes means, such as the processing circuitry 22, the processor 24, the device interface 28 or the like, for providing for communications via a primary cell and at least one secondary cell in a TDD network that supports carrier aggregation. In one embodiment, the primary and secondary cells have different TDD UL/DL subframe configurations and, in some instances, have overlapping subframes. In accordance with an example embodiment, the method, apparatus and computer program product redefine the HARQ timing and/or HARQ procedure so as to accommodate the different TDDUL/DL subframe configurations of the primary and secondary cells in a manner that reduces, if not eliminates, issues relating to DL and UL HARQ feedback otherwise occasioned by the overlapping subframes. As shown in block 42 of FIG. 5, the apparatus of the illustrated embodiment also includes means, such as the processing circuitry, the processor or the like, for defining at least one of: (i) UL or DL HARQ timing, (ii) the maximum number of DL HARQ processes, (iii) a number of UL HARQ processes or (iv) an UL HARQ process mapping to be the same for each of the primary and secondary cells having different TDD UL/DL subframe configurations. The definition of each of the foregoing HARQ parameters will be described hereinafter.

In this regard, the flow chart of FIG. 6 as well as the TDD UL/DL subframe configurations of FIGS. 7-14 illustrate the definition of the UL or DL HARQ timing so as to reduce, if not eliminate, issues otherwise occasioned by overlapping subframes of the primary and secondary cells that have different TDD UL/DL subframe configurations. In this embodiment, the apparatus 20 includes means, such as the processing circuitry 22, the processor 24, the device interface 28 or the like, for providing for communications via a primary cell and at least one secondary cell in a TDD network that supports carrier aggregation, as described above in conjunction with block 40 of FIG. 5 and as shown in block 50 of FIG. 6. As set forth by block 52 of FIG. 6, however, the apparatus of this embodiment also includes means, such as the processing circuitry, the processor or the like, for defining the UL or DL HARQ timing for each of the primary and secondary cells having TDD UL/DL subframe configurations based upon the UL or DL HARQ timing of the primary or secondary cell having the TDD UL/DL subframe configurations with the fewest number of DL or UL subframes, respectively. Indeed, the UL or DL HARQ timing for each of the primary and secondary cells of one embodiment are defined to be the same as the UL or DL HARQ timing of the primary and secondary cell having the TDD UL/DL subframe configuration with the fewest number of DL or UL subframes, respectively.

With respect to the UL HARQ timing, for example, the apparatus 20 of one example embodiment also includes means, such as the processing circuitry 22, the processor 24 or the like, for defining the UL HARQ timing for each of the primary and secondary cells having TDD UL/DL subframe configurations based upon, such as by being the same as, the UL HARQ timing of the primary or secondary cell having the TDD UL/DL subframe configurations with the fewest number of DL subframes, respectively. Conversely, with respect to the DL HARQ timing, the apparatus of one example embodiment also includes means, such as the processing circuitry, the processor or the like, for defining the DL HARQ timing for each of the primary and secondary cells having TDD UL/DL subframe configurations based upon, such as by being the same as, the DL HARQ timing of the primary or secondary cell having the TDD UL/DL subframe configurations with the fewest number of UL subframes, respectively.

In regards to the DL HARQ and with reference to FIG. 7, for example, the secondary cell and the primary cell have TDD UL/DL subframe configurations #0 and #1, respectively. The UL feedback timing for the secondary cell having a TDD UL/DL subframe configuration #0 would typically cause the UL feedback to be provided in subframe #4 as shown by dashed lines in FIG. 7, while the TDD UL/DL subframe configuration #1 of the primary cell would generally provide the UL feedback during subframe #7. In this example, the primary cell has fewer UL subframes than the secondary cell. As such, the UL feedback timing of the primary cell having a TDD UL/DL subframe configuration #1 is therefore followed by both the primary and the secondary cells. As such, the UL feedback for DL subframe #0 for the secondary cell is no longer provided by subframe #4, but is now provided by subframe #7 along with the UL feedback of DL subframe #0 of the primary cell.

By way of another example shown in FIG. 8, the primary cell may have a TDD UL/DL subframe configuration #0 and the secondary cell may have a TDD UL/DL subframe configuration #1. In this embodiment, the UL feedback timing for the primary cell would typically occur in subframe #4 as shown by the dashed line and the UL feedback timing for downlink subframe #0 of the secondary cell would generally occur in subframe #7. Since the TDD UL/DL subframe configuration of the secondary cell has fewer UL subframes than the TDD UL/DL subframe configuration of the primary cell, the UL feedback timing of the secondary cell remains the same, but the UL feedback timing of the primary cell is defined to be the same as the secondary cell. As such, the UL feedback of downlink subframe #0 of the primary cell is provided by subframe #7 as shown, in this example embodiment, by the solid lines. It is noted that the UL feedback carried by the physical uplink control circuit (PUCCH) is still transmitted by the primary cell even though the UL feedback timing is defined in accordance with the TDD UL/DL subframe configuration of the secondary cell.

An additional example of the DL HARQ timing is provided in FIG. 9 in which a first secondary cell, a primary cell and a second secondary cell have TDD UL/DL subframe configurations #0, #1 and #6, respectively. As shown by dashed lines in FIG. 9, the UL feedback of DL subframe #0 of the first and second secondary cells would generally be provided by subframe #4 and subframe #7, respectively, in accordance with TDD UL/DL subframe configurations #0 and #6, respectively. Since the TDD UL/DL subframe configuration #1 of the primary cell has the fewest UL subframes, however, the DL HARQ timing, that is, the UL feedback timing, of the first and second secondary cells will be defined to be the same as that of TDD UL/DL subframe configuration #1 of the primary cell. As such, the UL feedback of DL subframe #0 is therefore provided by subframe #7 for each of the primary and secondary cells. Similarly, the UL feedback for DL subframe #9 of the second secondary cell is defined to be equal to that of the primary cell so as to be carried by the second subframe #3 of the primary cell instead of the second subframe #4 of the second secondary cell as shown in dashed lines in FIG. 9.

By way of another example, FIG. 10 illustrates an instance in which the primary cell, the first secondary cell and the second secondary cell have TDD UL/DL subframe configurations #0, #1 and #6, respectively. As shown by dashed lines, the UL feedback timing of the primary cell for DL subframe #0 would typically be provided by subframe #4 and the UL feedback timing of the second secondary cell for DL subframe #0 would typically be provided by subframe #7. Since the first secondary cell having the TDD UL/DL subframe configuration #1 has the fewest UL subframes, however, the primary cell and each of the secondary cells of this embodiment have DL HARQ timing, that is, UL feedback timing, that is the same as that of TDD UL/DL subframe configuration #1 of the first secondary cell. As such, the UL feedback of the DL subframe #0 is provided by subframe #7 as shown by solid lines in the embodiment of FIG. 10. Additionally, the UL feedback for the DL subframe #9 of the first and second secondary cells is also provided in this embodiment in accordance with the UL feedback timing of the first secondary cell so as to be provided by the second subframe #0, as opposed to the second subframe #4 of the second secondary cell as shown by dashed lines in FIG. 10. As before, the UL feedback carried by the PUCCH is still transmitted on the primary cell although the UL feedback timing of this embodiment follows that defined by the first secondary cell since the first secondary cell has the fewest UL subframes.

In regards to the UL HARQ and with reference to FIG. 11, for example, the primary cell and the secondary cell have TDD UL/DL subframe configurations #0 and #1, respectively. The UL HARQ timing for the secondary cell having a TDD UL/DL subframe configuration #1 would typically cause the UL grant to be provided in subframe #8 and the DL feedback to be provided in the second subframe #4 as shown by dashed lines in FIG. 11, while the TDD UL/DL subframe configuration #0 of the primary cell would generally provide the UL grant in Subframe #8 and DL feedback during subframe #5. In this example, the primary cell has fewer DL subframes than the secondary cell. As such, the UL grant timing and the DL feedback timing of the primary cell having a TDD UL/DL subframe configuration #0 is therefore followed by both the primary and the secondary cells. As such, the DL feedback for UL subframe #8 for the secondary cell is no longer provided by subframe #4, but is now provided by subframe #5 along with the DL feedback of UL subframe #0 of the primary cell.

By way of another example shown in FIG. 12, the primary cell may have a TDD UL/DL subframe configuration #1 and the secondary cell may have a TDD UL/DL subframe configuration #0. In this embodiment, the DL feedback timing for the primary cell would typically occur in the second subframe #4 as shown by the dashed line and the DL feedback timing for UL subframe #8 of the secondary cell would generally occur in subframe #5. Since the TDD UL/DL subframe configuration of the secondary cell has fewer DL subframes than the TDD UL/DL subframe configuration of the primary cell, the DL feedback timing of the secondary cell remains the same, but the DL feedback timing of the primary cell is defined to be the same as the secondary cell. As such, the DL feedback of UL subframe #8 of the primary cell is provided by subframe #5 as shown, in this example embodiment, by the solid lines.

An additional example of the UL HARQ timing is provided in FIG. 13 in which a primary cell and first and second secondary cells have TDD UL/DL subframe configurations #0, #1 and #6, respectively, and the typical UL grant and DL feedback are shown in dashed lines. Since the TDD UL/DL subframe configuration #1 of the primary cell has the fewest DL subframes, however, the UL HARQ timing, that is, the UL grant and the DL feedback timing, of the first and second secondary cells will be defined to be the same as that of TDD UL/DL subframe configuration #0 of the primary cell. As such, the UL grant is provided for each of the primary and secondary cells in subframe #8 and the DL feedback for each of the cells is provided in the second subframe #5. It is noted that the UL grant carried by the physical downlink control channel (PDCCH) and the DL feedback carried by the PHICH is still transmitted on the primary cell although the UL grant timing and the DL feedback timing of this embodiment follows that defined by the secondary cell since the secondary cell has the fewest DL subframes.

By way of another example, FIG. 14 illustrates an instance in which the first secondary cell, the primary cell and the second secondary cell have TDD UL/DL subframe configurations #0, #1 and #6, respectively, and the typical UL grant and DL feedback are shown in dashed lines. Since the first secondary cell having the TDD UL/DL subframe configuration #0 has the fewest DL subframes, however, the primary cell and each of the secondary cells of this embodiment have UL HARQ timing, that is, UL grant timing and DL feedback timing, that is the same as that of TDD UL/DL subframe configuration #0 of the first secondary cell. As such, the UL grant of this embodiment is provided by subframe #8 and the DL feedback is provided by the second subframe #5 as shown by solid lines for each of the cells in the embodiment of FIG. 14. As before, the UL grant carried by the PDCCH and the DL feedback carried by the PHICH is still transmitted on the primary cell although the UL grant timing and the DL feedback timing of this embodiment follows that defined by the first secondary cell since the first secondary cell has the fewest DL subframes.

In another embodiment shown, for example, by block 60 of FIG. 15, the apparatus 20 again includes means, such as the processing circuitry 22, the processor 24, the device interface 28 or the like, for providing communications via a primary cell and at least one secondary cell of a TDD network that supports carrier aggregation in accordance with different TDD UL/DL subframe configurations. The apparatus of this embodiment also includes means, such as the processing circuitry, the processor or the like, for defining the maximum number of DL HARQ processes for each of the TDD UL/DL subframe configurations based upon the maximum number of DL HARQ processes of the TDD UL/DL subframe configuration having the fewest number of UL subframes. See block 62. In one embodiment, for example, the maximum number of DL HARQ processes for each of the TDD UL/DL subframe configurations is defined to be equal to the maximum number of DL HARQ processes of the TDD UL/DL subframe configurations having the fewest number of UL subframes. By way of example, in an instance in which a secondary cell has TDD configuration #0 and the primary cell has TDD configuration #1, the maximum number of DL HARQ processes for TDD UL/DL subframe configuration #0 is 4 and the maximum number of DL HARQ processes for TDD UL/DL subframe configuration #1 is 7. Thus, the maximum number of DL HARQ processes for both the primary and secondary cells of this embodiment may be set equal to 7 as 7 is the maximum number of DL HARQ processes of either TDD UL/DL subframe configuration of the primary and secondary cells.

As shown, for example, by block 70 of FIG. 16, the apparatus 20 again includes means, such as the processing circuitry 22, the processor 24, the device interface 28 or the like, for providing communications via a primary cell and at least one secondary cell of a TDD network that supports carrier aggregation in accordance with different TDD UL/DL subframe configurations. As shown in block 72, the apparatus of this embodiment also includes means, such as the processing circuitry, the processor or the like, for defining the number of UL HARQ processes for each of the TDD UL/DL subframe configurations based upon the number of UL HARQ processes of the TDD UL/DL subframe configuration having the fewest number of DL subframes. In one embodiment, for example, the number of UL HARQ processes for each of the TDD UL/DL subframe configurations is set equal to the number of UL HARQ processes of the TDD UL/DL subframe configuration having the fewest number of UL subframes. By way of example in which the primary cell has TDD UL/DL subframe configuration #0 and the secondary cell has TDD UL/DL subframe configuration #1, the TDD UL/DL subframe configuration #0 has a UL HARQ process number of 7 and the TDD UL/DL subframe configuration #1 has a UL HARQ process number of 4. Thus, the HARQ process number may be set equal to 7 in this example for both the primary and secondary cells since the primary cell that has the UL HARQ process number of 7 has the fewest number of DL subframes.

In a further embodiment shown in FIG. 17, the apparatus 20 may include means, such as the processing circuitry 22, the processor 24 or the like, for defining the UL HARQ process mapping for each of the TDD UL/DL subframe configurations based upon the UL HARQ process mapping of the TDD UL/DL subframe configuration having the fewest number of DL subframes. In one embodiment, for example, the UL HARQ process mapping may be defined for each of the TDD UL/DL subframe configurations to be the same as the UL HARQ process mapping of the TDD UL/DL subframe configuration having the fewest number of DL subframes. In the embodiment shown in FIG. 18, for example, the primary cell has TDD UL/DL subframe configuration #0 and the secondary cell has TDD UL/DL subframe configuration #1. Additionally, the TDD UL/DL subframe configuration #0 has a UL HARQ process number of 7 and the TDD UL/DL subframe configuration #1 has a UL HARQ process number of 4. Thus, the HARQ process number may be set equal to 7 in this example for both the primary and secondary cells since the primary cell has the fewest number of DL subframes. In the embodiment shown in FIG. 18, for example, the UL HARQ process mapping of the primary cell will also be utilized as a UL HARQ process mapping of the secondary cell since the primary cell has the fewest number of DL subframes regardless of whether the mapped subframe of the secondary cell is a UL subframe or a DL subframe. As shown in FIG. 18, for example, subframe #4 of the secondary cell is mapped in accordance with the UL HARQ process even though subframe #4 of the secondary cell is a DL subframe. Likewise, subframes #9 of the first radio frame and subframe #4 and #9 of the subsequent radio frame of the secondary cell are also mapped in accordance with the UL HARQ process even though the subframes of the secondary cell are DL subframes. Although the UL HARQ process maps these DL subframes, the mobile terminal 10 of one embodiment will not utilize these subframes of the secondary cell for a UL transmission.

Methods, apparatus and computer program products of example embodiments therefore define the HARQ functionality for primary and secondary cells having different TDD UL/DL subframe configurations so as to reduce or eliminate instances in which the feedback is blocked and the UL grant is missed. In one example, the methods, apparatus and computer program product define the HARQ timing and/or HARQ procedure in such a manner as to allow feedback to be provided via the primary and secondary cells even though the primary and secondary cells have different TDD UL/DL subframe configurations with overlapping subframes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while principally described herein in conjunction with LTE, the method and apparatus of example embodiments may be employed in conjunction with other types of systems. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for communications via a primary cell and at least one secondary cell in a time division duplex (TDD) network that supports carrier aggregation in accordance with different TDD uplink (UL)/downlink (DL) subframe configurations; and
defining at least one of-UL or DL hybrid automatic repeat request (HARQ) timing to be the same for each of the primary and secondary cells having different TDD UL/DL subframe configurations and having different scheduled HARQ timings predetermined according to the different TDD UL/DL subframe configurations, by defining the UL HARQ timing to be the same as the predetermined UL HARQ timing of the primary or secondary cell having the TDD UL/DL subframe configuration with the fewest number of DL subframes or defining the DL HARQ timing to be the same as the predetermined DL HARQ timing of the primary or secondary cell having the TDD UL/DL subframe configuration with the fewest number of UL subframes independent of whether any of the primary or secondary cell has a predetermined UL or DL HARQ timing that provides for an earlier available subframe for providing feedback for the UL or DL HARQ, such that feedback for the UL HARQ is provided for both the primary and secondary cell in only one or more DL subframes corresponding to the respective predetermined UL HARQ timing of the primary or secondary cell having the TDD UL/DL subframe configuration with the fewest number of respective DL subframes or such that feedback for the DL HARQ is provided for both the primary and secondary cell in only one or more respective UL subframes corresponding to the respective predetermined DL HARQ timing of the primary or secondary cell having the TDD UL/DL subframe configuration with the fewest number of respective UL subframes, and without allowing any uplink or downlink HARQ feedback at a subframe timing where there is an uplink subframe configured for one of the primary or secondary cell and a downlink subframe configured for the other of the primary or secondary cell, and all HARQ feedback is transmitted or received in the primary cell.

2. A method according to claim 1, further comprising defining a maximum number of DL HARQ processes for each of the TDD UL/DL subframe configurations based upon the maximum number of DL HARQ processes of the TDD UL/DL subframe configuration among the primary cell and the secondary cell having a fewest number of UL subframes.

3. A method according to claim 2 wherein defining the maximum number of DL HARQ processes further comprises defining the maximum number of DL HARQ processes for each of the TDD UL/DL subframe configurations to be equal to the maximum number of DL HARQ processes of the TDD UL/DL subframe configuration among the primary cell and the secondary cell having a fewest number of UL subframes.

4. A method according to claim 1, further comprising defining a number of UL HARQ processes for each of the TDD UL/DL subframe configurations based upon the number of UL HARQ processes of the TDD UL/DL subframe configuration among the primary cell and the secondary cell having a fewest number of DL subframes.

5. A method according to claim 4 wherein defining the number of UL HARQ processes further comprises defining the number of UL HARQ processes for each of the TDD UL/DL subframe configurations to be equal to the number of UL HARQ processes of the TDD UL/DL subframe configuration among the primary cell and the secondary cell having the fewest number of DL subframes.

6. A method according to claim 1, further comprising defining a UL HARQ process mapping for each of the TDD UL/DL subframe configurations based upon the UL HARQ process mapping of the TDD UL/DL subframe configuration among the primary cell and the secondary cell having a fewest number of DL subframes.

7. A method according to claim 6 wherein defining the UL HARQ process mapping further comprises defining the UL HARQ process mapping for each of the TDD UL/DL subframe configurations to be the same as the UL HARQ process mapping of the TDD UL/DL subframe configuration among the primary cell and the secondary cell having the fewest number of DL subframes.

8. An apparatus comprising:
a memory storing instructions; and
circuitry configured, based on the instructions stored in the memory, to:
provide for communications via a primary cell and at least one secondary cell in a time division duplex (TDD) network that supports carrier aggregation in accordance with different TDD uplink (UL)/downlink (DL) subframe configurations; and define at least one of UL or DL hybrid automatic repeat request (HARQ) timing to be the same for each of the primary and secondary cells having different TDD UL/DL subframe configurations and having different scheduled HARQ timings predetermined according to the different TDD UL/DL subframe configurations, by defining the UL HARQ timing to be the same as the predetermined UL HARQ timing of the primary or secondary cell having the TDD UL/DL subframe configuration with the fewest number of DL subframes or defining the predetermined DL HARQ timing to be the same as the DL HARQ timing of the primary or secondary cell having the TDD UL/DL subframe configuration with the fewest number of UL subframes independent of whether any of the primary or secondary cell has a predetermined UL or DL HARQ timing that provides for an earlier available subframe for providing feedback for the UL or DL HARQ, such that feedback for the UL HARQ is provided for both the primary and secondary cell in only one or more DL subframes corresponding to the respective predetermined UL HARQ timing of the primary or secondary cell having the TDD UL/DL subframe configuration with the fewest number of respective DL subframes or such that feedback for the DL HARQ is provided for both the primary and secondary cell in only one or more respective UL subframes corresponding to the respective predetermined DL HARQ timing of the primary or secondary cell having the TDD UL/DL subframe configuration with the fewest number of respective UL subframes, and without allowing any uplink or downlink HARQ feedback at a subframe timing where there is an uplink subframe configured for one of the primary or secondary cell and a downlink subframe configured for the other of the primary or secondary cell, and all HARQ feedback is transmitted or received in the primary cell.

9. An apparatus according to claim 8, wherein the circuitry is configured to to define a maximum number of DL HARQ processes for each of the TDD UL/DL subframe configurations based upon a maximum number of DL HARQ processes of the TDD UL/DL subframe configuration among the primary cell and the secondary cell having a fewest number of UL subframes.

10. An apparatus according to claim 8, wherein the circuitry is configured to define a number of UL HARQ processes by defining a number of UL HARQ processes for each of the TDD UL/DL subframe configurations based upon the number of UL HARQ processes of the TDD UL/DL subframe configuration among the primary cell and the secondary cell having a fewest number of DL subframes.

11. An apparatus according to claim 8, wherein the circuitry is configured to define a UL HARQ process mapping by defining the UL HARQ process mapping for each of the TDD UL/DL subframe configurations based upon the UL HARQ process mapping of the TDD UL/DL subframe configuration among the primary cell and the secondary cell having a fewest number of DL subframes.

12. An apparatus according to claim 8, wherein the apparatus is embodied in a mobile terminal.

13. A non-transitory computer-readable storage medium having computer-executable program code instructions stored therein, the computer-executable program code instructions comprising program code instructions for:

providing for communications via a primary cell and at least one secondary cell in a time division duplex (TDD) network that supports carrier aggregation in accordance with different TDD uplink (UL)/downlink (DL) subframe configurations; and defining at least one of-UL or DL hybrid automatic repeat request (HARQ) timing to be the same for each of the primary and secondary cells having different TDD UL/DL subframe configurations and having different scheduled HARQ timings predetermined according to the different TDD UL/DL subframe configurations, by defining the UL HARQ timing to be the same as the predetermined UL HARQ timing of the primary or secondary cell having the TDD UL/DL subframe configuration with the fewest number of DL subframes or defining the DL HARQ timing to be the same as the predetermined DL HARQ timing of the primary or secondary cell having the TDD UL/DL subframe configuration with the fewest number of UL subframes independent of whether any of the primary or secondary cell has a predetermined UL or DL HARQ timing that provides for an earlier available subframe for providing feedback for the UL or DL HARQ, such that feedback for the UL HARQ is provided for both the primary and secondary cell in only one or more DL subframes corresponding to the respective predetermined UL HARQ timing of the primary or secondary cell having the TDD UL/DL subframe configuration with the fewest number of respective DL subframes or such that feedback for the DL HARQ is provided for both the primary and secondary cell in only one or more respective UL subframes corresponding to the respective predetermined DL HARQ timing of the primary or secondary cell having the TDD UL/DL subframe configuration with the fewest number of respective UL subframes, and without allowing any uplink or downlink HARQ feedback at a subframe timing where there is an uplink subframe configured for one of the primary or secondary cell and a downlink subframe configured for the other of the primary or secondary cell, and all HARQ feedback is transmitted or received in the primary cell.

* * * * *